J. FARRELL.
BRAKE MECHANISM.
APPLICATION FILED FEB. 19, 1915.

1,145,061. Patented July 6, 1915.

Attest:

Inventor: J. Farrell
by ____ Atty.

UNITED STATES PATENT OFFICE.

JOHN FARRELL, OF NEWTON, NEW JERSEY.

BRAKE MECHANISM.

1,145,061.  Specification of Letters Patent.  Patented July 6, 1915.

Application filed February 19, 1915. Serial No. 9,387.

*To all whom it may concern:*

Be it known that I, JOHN FARRELL, a citizen of the United States, and a resident of Newton, in the county of Sussex and State of New Jersey, have invented certain new and useful Improvements in Brake Mechanism, of which the following is a specification.

This invention relates to certain new and useful improvements in hoists.

The object of my invention is to provide a new and improved hoist, which is provided with a ratchet and pawl which operate in conjunction with a brake and serves for preventing reverse movement of the hoisting drum, and which pawl can be thrown out of operation whenever desired, all of which is simple in construction, strong and durable.

Figure 1:
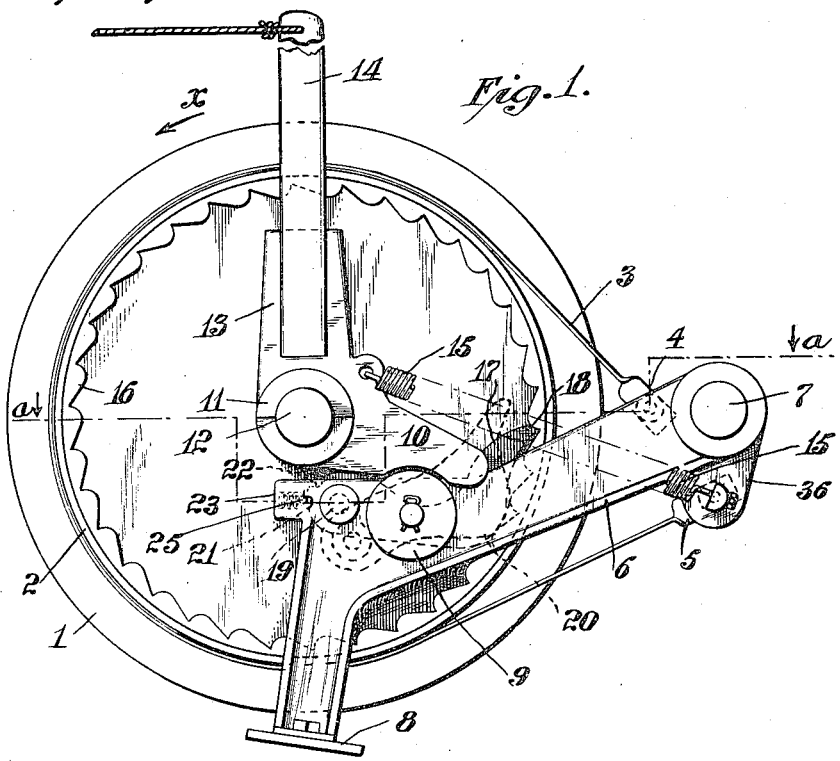
Figure 2:
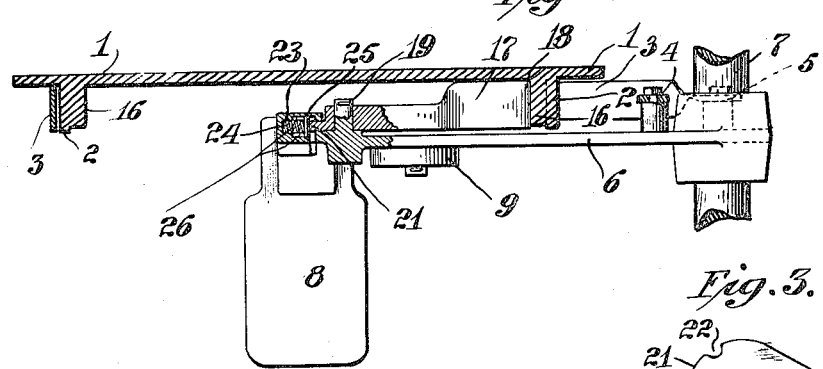
Figure 3:
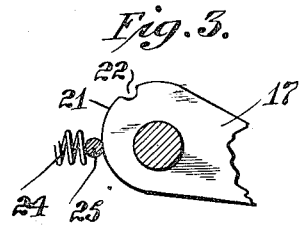

In the accompanying drawings:—Figure 1 is an end view of a hoist provided with an embodiment of my improvement, parts being broken away. Fig. 2 is a sectional plan view on the line *a—a* of Fig. 1. Fig. 3 is a detail.

The hoisting drum is provided on one end head 1 with a flange 2 forming a brake surface for a brake band 3 surrounding said flange and having its ends fastened at 4 and 5 to one end of a lever 6 pivoted at 7. At its opposite end the lever is provided with a foot pedal 8. A roller 9 is mounted on the lever 6 near the free end and on this roller an arm 10 can act which projects from a sleeve 11 on the shaft 12 of the drum, which sleeve has a socket 13 in which a manipulating or handle lever 14 is secured. A spring 15 is attached to the arm 36 of the lever 6 and to the sleeve 11. Ratchet teeth 16 inclined in the reverse direction of rotation of the drum are formed on the inner side of the flange 2. A pawl 17 having a nose 18 for engaging the ratchet teeth, at its free end, is pivoted at its opposite end to a stud 19 formed on the lever 6 at the free end of this lever and this pawl 17 is provided between its ends with a cam 20 on its outer edge, which cam rides on the teeth 16 of the ratchet wheel. The pawl 17 is provided on its end edge opposite the one provided with the nose 18 with a cam 21 and an offset 22. A recess 23 is formed in the swinging end of the lever 6 and contains a spring 24 which presses a pin or roller 25 against the cam 21. The pin or roller can slide in the recess 23 and is guided in its movements by having its ends inserted into two longitudinal grooves 26 in the sides of the recess 23.

The operation is as follows:—When the drum rotates in the direction of the arrow *x*, the cam edge of the pawl rides on ratchet teeth and for each tooth lifts the nose out from the end of another tooth. As soon as the drum is rotated in the inverse direction of the arrow *x*, the nose catches on a ratchet tooth and stops the drum. When the brake is applied by forcing down the lever 6 against the tension of the spring 15, the cam 20 of the pawl acting as a fulcrum on the teeth, throws the nose 18 out of engagement with the teeth but when the pressure on the lever 6 is removed, the lever rises to its neutral or normal position carrying the pivoted end of the pawl with it and thus allows the nose to rest on and engage in the teeth. When the pawl is to be thrown out of action, its nose end is raised until the offset 22 arrives at the roller or pin 25 which snaps over it and temporarily holds the nose end from the teeth. When the nose end is engaged with the teeth, the spring 26 presses the roller or pin 25 against the cam 21 and this spring pressure causes the nose end of pawl 17 to pass into the recesses between two teeth 16.

Having described my invention what I claim as new and desire to secure by Letters Patent is:—

1. The combination with a hoisting drum, of ratchet teeth on the same, a brake for said drum, a pivoted lever connected with said brake, a pawl pivoted to said lever and adapted to engage the ratchet teeth, a lever for actuating said brake lever and a spring connected with the brake lever and with the lever for acting on the brake lever, substantially as set forth.

2. The combination with a hoisting drum, of ratchet teeth on the same, a brake for said drum, a pivoted lever connected with said brake, a pawl pivoted to said lever and adapted to engage the ratchet teeth, said pawl having a cam surface between the ends of said pawl riding on the ratchet teeth, a lever for actuating said brake lever and a spring connected with the brake lever and with the lever for acting on the brake lever, substantially as set forth.

3. The combination with a hoisting drum, of ratchet teeth on the same, a brake for said drum, a pivoted lever connected with said brake, a pawl pivoted to said lever and adapted to engage the ratchet teeth, said pawl having a cam surface on its outer edge between its ends, which pawl rides on the ratchet teeth, a lever for actuating said brake lever and a spring connected with the brake lever and with the lever for acting on the brake lever, substantially as set forth.

4. The combination with a hoisting drum, of ratchet teeth on the same, a brake for said drum, a pivoted lever connected with said brake, a pawl pivoted to said lever and adapted to engage the ratchet teeth, said pawl being formed with a cam riding on the ratchet teeth and means engaging the pivoted end of the pawl to keep the opposite end out of engagement with the teeth, a lever for actuating said brake lever and a spring connected with the brake lever and with the lever for acting on the brake lever, substantially as set forth.

5. The combination with a hoisting drum, of ratchet teeth on the same, a brake for said drum, a pivoted lever connected with said brake, a pawl pivoted to said lever and adapted to engage the ratchet teeth, said pawl having an offset at its pivoted end, a spring pressed member in the member to which the pawl is pivoted, engaging the end of the pawl provided with the offset, a lever for actuating said brake lever and a spring connected with the brake lever and with the lever for acting on the brake lever, substantially as set forth.

6. The combination with a hoisting drum, of ratchet teeth on the same, a brake for said drum, a pivoted lever connected with said brake, a pawl pivoted to said lever and adapted to engage the ratchet teeth, said pawl being provided with an offset in its pivoted end, a sliding member mounted in the member to which the pawl is pivoted and a spring bearing against said sliding member, a lever for actuating said brake lever and a spring connected with the brake lever and with the lever for acting on the brake lever, substantially as set forth.

7. The combination with a hoisting drum, of ratchet teeth on the same, a brake for said drum, a pivoted lever connected with said brake, a pawl pivoted to said lever and adapted to engage the ratchet teeth, said pawl being provided with an offset in its pivoted end, a sliding member mounted in the member to which the pawl is pivoted, a recess in said member, a spring in said member bearing against the sliding member, the recess having grooves for guiding said member, a lever for actuating said brake lever and a spring connected with the brake lever and with the lever for acting on the brake lever, substantially as set forth.

8. The combination with a hoisting drum, of ratchet teeth on the same, a brake for said drum, a pivoted lever connected with said brake, a pawl pivoted to said lever and adapted to engage the ratchet teeth, said pawl having a cam edge at the pivoted end, a spring pressed member bearing on the cam edge, said spring pressed member being mounted in the member to which the pawl is pivoted, a lever for actuating said brake lever and a spring connected with the brake lever and with the lever for acting on the brake lever, substantially as set forth.

9. The combination with a hoisting drum, of a ratchet wheel on the same, a brake band, a brake lever, a stud cast in the brake lever, a pawl mounted on said stud, which pawl engages the ratchet teeth, means for shifting the brake lever and a spring attached to said means and to the brake lever, substantially as set forth.

Signed at Newton, in the county of Sussex and State of New Jersey, this 12 day of February A. D. 1915.

JOHN FARRELL.

Witnesses:
FRANK I. FARRELL,
IDA M. FARRELL.